| | X | Y | | X | Y |
|---|---|---|---|---|---|
| 1 | | L | 31 | | / |
| 2 | W | | 32 | ( | |
| 3 | | ( ) | 33 | 6 | |
| 4 | — | BDIOP 8 | 34 | 9 | |
| 5 | | — | 35 | 8X | |
| 6 | ˆ | | 36 | BKR | |
| 7 | | | 37 | 3 | |
| 8 | | ´ | 38 | | H |
| 9 | DL | | 39 | | MNW |
| 10 | 1 | | 40 | E | |
| 11 | N | | 41 | F | |
| 12 | | ˜ | 42 | | 6 |
| 13 | | J | 43 | + | |
| 14 | | 4 | 44 | | 9 |
| 15 | J | | 45 | | XK |
| 16 | | 7 | 46 | TY | |
| 17 | | 35 | 47 | | + |
| 18 | | 1 | 48 | | 2 |
| 19 | 7C | | 49 | 25S | |
| 20 | ` | | 50 | | SC |
| 21 | | T | 51 | | Q |
| 22 | | U | 52 | | Y |
| 23 | | V | 53 | P | |
| 24 | ¨ | | 54 | Q | |
| 25 | VUM/-O | | 55 | 4 | |
| 26 | A | | 56 | | R |
| 27 | | E | 57 | G | |
| 28 | | Z | 58 | | AG |
| 29 | Z | | 59 | | F |
| 30 | H | | 60 | I | — |

INVENTOR
ENZO ASCOLI

BY Emery L. Groff
ATTY

FIG. 11

| | X | Y | | X | Y |
|---|---|---|---|---|---|
| A | 26 | 58 | 1 | 10 | 18 |
| B | 36 | 4 | 2 | 49 | 48 |
| C | 19 | 50 | 3 | 37 | 17 |
| D | 9 | 4 | 4 | 55 | 14 |
| E | 40 | 27 | 5 | 49 | 17 |
| F | 41 | 59 | 6 | 33 | 42 |
| G | 57 | 58 | 7 | 19 | 16 |
| H | 30 | 38 | 8 | 35 | 4 |
| I | 60 | 4 | 9 | 34 | 44 |
| J | 15 | 13 | ( | 32 | 3 |
| K | 36 | 45 | ) | 24 | 3 |
| L | 9 | 1 | / | 25 | 31 |
| M | 25 | 39 | – | 25 | 60 |
| N | 11 | 39 | + | 43 | 47 |
| O | 25 | 4 | ∧ | 6 | 12 |
| P | 53 | 4 | \ | 20 | 8 |
| Q | 54 | 51 | / | 24 | 8 |
| R | 36 | 56 | — | 4 | 5 |
| S | 49 | 50 | , | 24 | 7 |
| T | 46 | 21 | | | |
| U | 25 | 22 | | | |
| V | 25 | 23 | | | |
| W | 2 | 39 | | | |
| X | 35 | 45 | | | |
| Y | 46 | 52 | | | |
| Z | 29 | 28 | | | |

INVENTOR
ENZO ASCOLI
BY Emery L. Groff Jr.
Atty

United States Patent Office 3,349,176
Patented Oct. 24, 1967

3,349,176
CIRCUIT FOR PRODUCING COMPLEX VOLTAGES FOR CONTROLLING A DEVICE FOR WRITING LETTERS, NUMBERS AND SIGNS
Enzo Ascoli, Lausanne, Vaud, Switzerland, assignor to Paillard S.A., Sainte-Croix, Vaud, Switzerland, a corporation of Switzerland
Filed Oct. 17, 1963, Ser. No. 316,922
Claims priority, application Switzerland, Oct. 26, 1962, 12,626/62
4 Claims. (Cl. 178—30)

ABSTRACT OF THE DISCLOSURE

A circuit for producing complex electric signals for forming clearly distinguishable letters of the alphabet, numbers and signs, commonly associated with the keyboard of a typewriter, where the electric signals produced represent the signals applied to the coordinate axes of a device, such as a cathode ray tube or a coordinate controlled typing head of a typewriter, for tracing or forming the signs, letters and numbers. All of the complex electric signals are formed from two continuous voltages of opposite polarity, and two groups of four AC voltages each, where the four voltages of one group are of the same frequency and successively displaced in phase by 90°, and the four voltages of the other group are double the frequency of the voltages of the first group and are also successively displaced in phase by 90°.

Background of the invention

The present invention concerns a device for providing electric signals for the control of a typewriter having co-ordinates.

An object of the present invention is to provide an improvement in or modification of the subject of patent application No. 124,631, Arrangement for Producing Electric Signals Controlling the Typing of Typewriter Signs Defined by Coordinates, now Patent 3,182,126, issued May 4, 1965.

The said Patent 3,182,126 concerns a device for providing electric signals for the control of a typewriter having coordinates, in which a tracing device is excited by at least two electric signals representing two components in accordance with two co-ordinate axes of the displacement to be effected for tracing any signs, capital or lower case letters or numbers entering into the usual composition of a keyboard of a typewriter. This device is characterised in that it comprises an electric generator producing in a permanent manner a predetermined number of periodic electric waves of different forms and frequency, and means permitting, for each sign, letter or number to be traced, for selecting the wave, or selecting the waves necessary to form the electric signals, corresponding to the components of displacements to be effected for tracing the particular sign.

In the device described in the said patent, it was necessary to combine two different groups of components for the writing of certain characters, especially to write the numerals two, four, five, six and nine, likewise for a number of letters. In other words, these particular numbers or letters were written in two steps, a first group of components effecting the writing of the first part of the character, and another group effecting the writing of the second part of the character.

The present invention seeks to provide a device wherein all the numbers and letters can be written by means of a single group of two horizontal and vertical components.

Summary of the invention

The device of the present invention provides electric signals for the control of a typewriter having co-ordinates, wherein a tracing device is excited by at least two electric signals representing two components in accordance with the co-ordinate axes of the displacement to be effected to trace any one of the characters, capital or lower case letters or numbers entering into the usual composition of a keyboard of a typewriter. The invention includes an electric generator which continuously provides a certain number of periodic electric waves of different forms and frequencies, and circuits which elaborate, for each of the characters or signs to be written, the forms and frequencies of the waves which are necessary for the excitation of the tracing device to permit the signs in question to be written. Devices are also provided for selecting the waves for each of the signs to be written. The generator supplies the circuits with two group of four voltages sensibly sinusoidal, the four voltages of one group being of the same frequency, but successively displaced in phase by 90°, whilst the four voltage of the other group are of a double frequency and likewise mutually displaced in phase by 90°, and two continuous voltages of opposite polarities.

Description of the preferred embodiment

Figure 1:
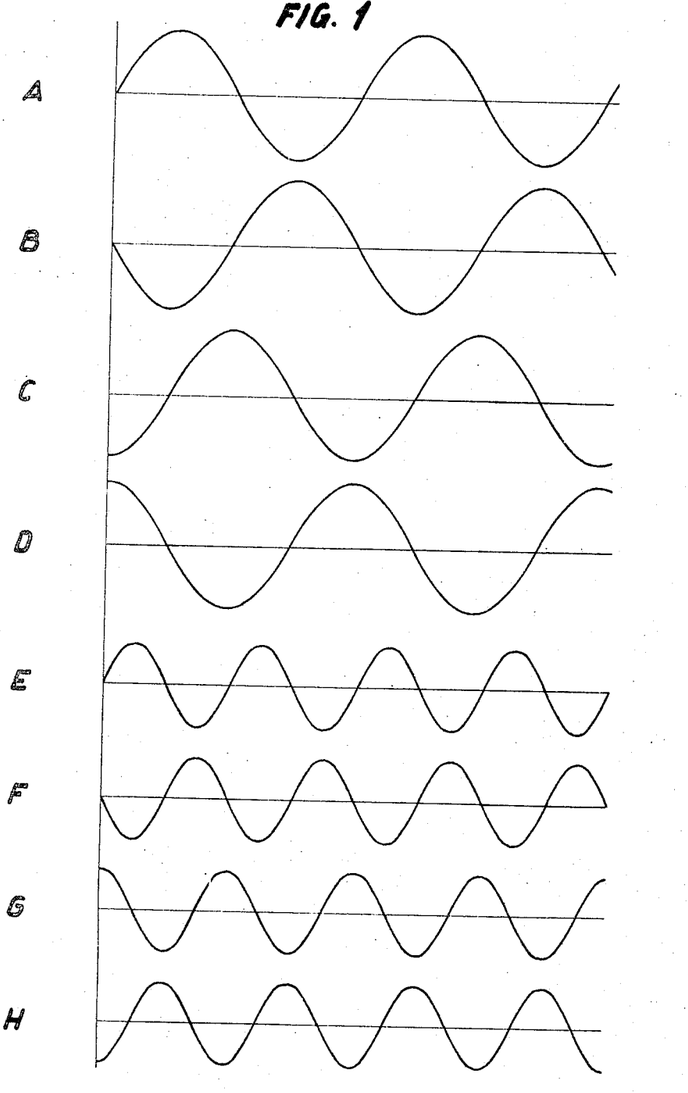
FIG. 1 is a diagram showing eight sinusoidal waves furnished in a continuous manner by an electric generator feeding the device.
Figure 2:
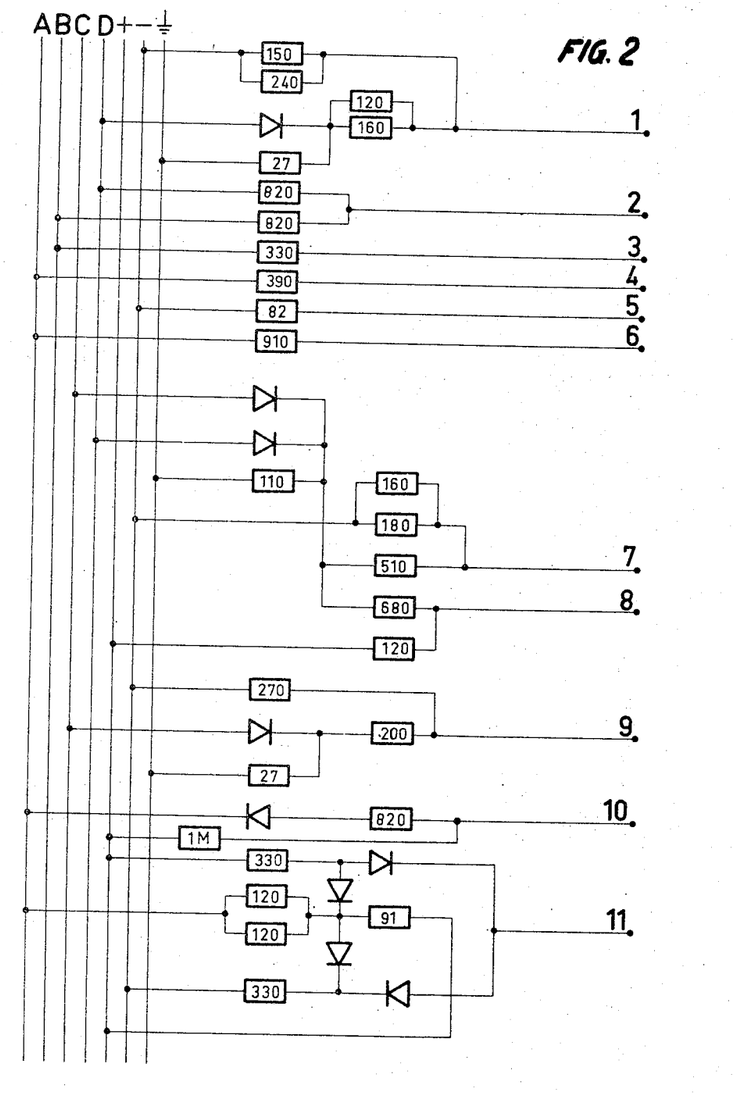
FIG. 2 is a diagram of the circuits supplying signal components numbered 1 to 11.
Figure 3:
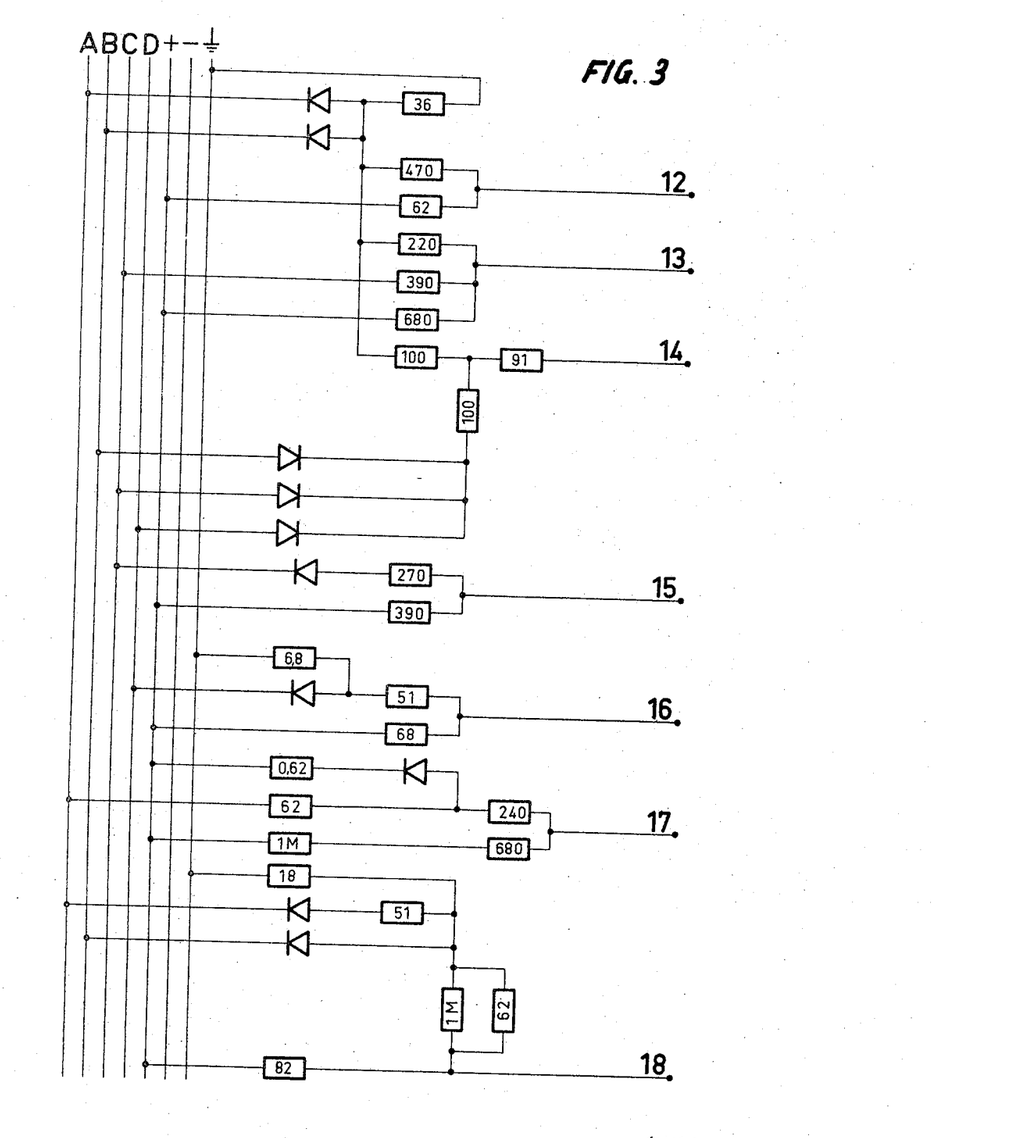
FIG. 3 is a diagram of the circuits for supplying signal components numbered 12 to 18.
Figure 4:
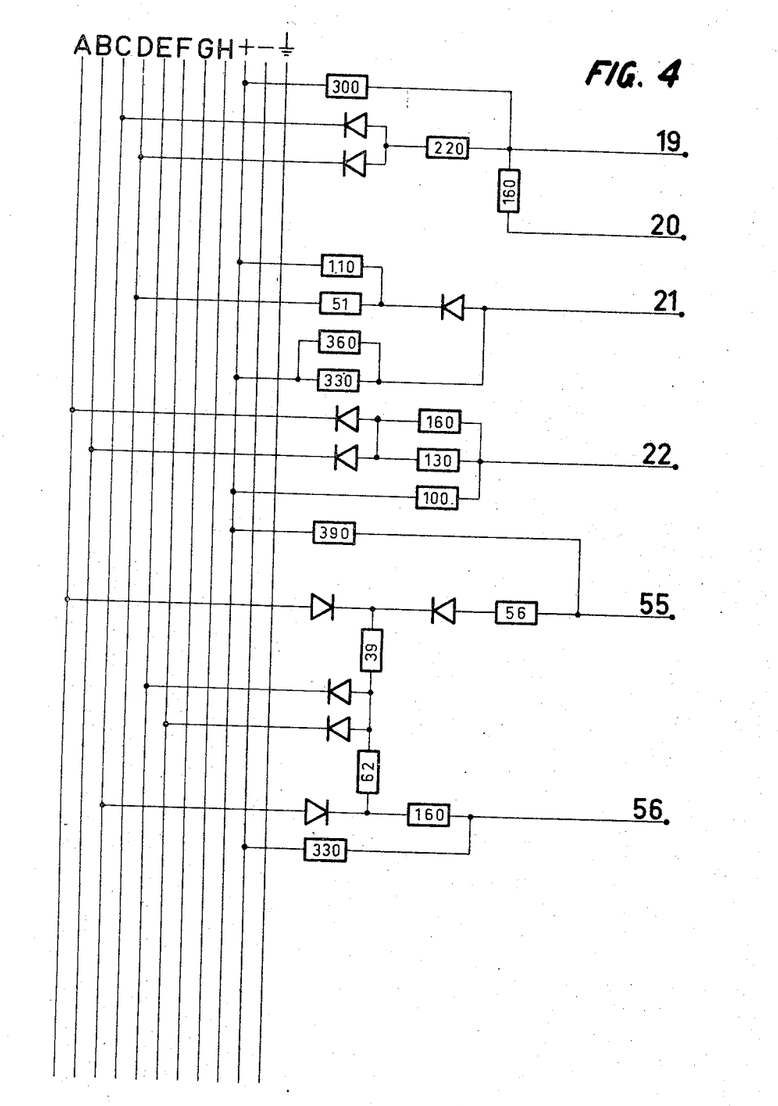
FIG. 4 is a diagram of the circuits for supplying signal components numbered 19 to 22, and 55 and 56.
Figure 5:
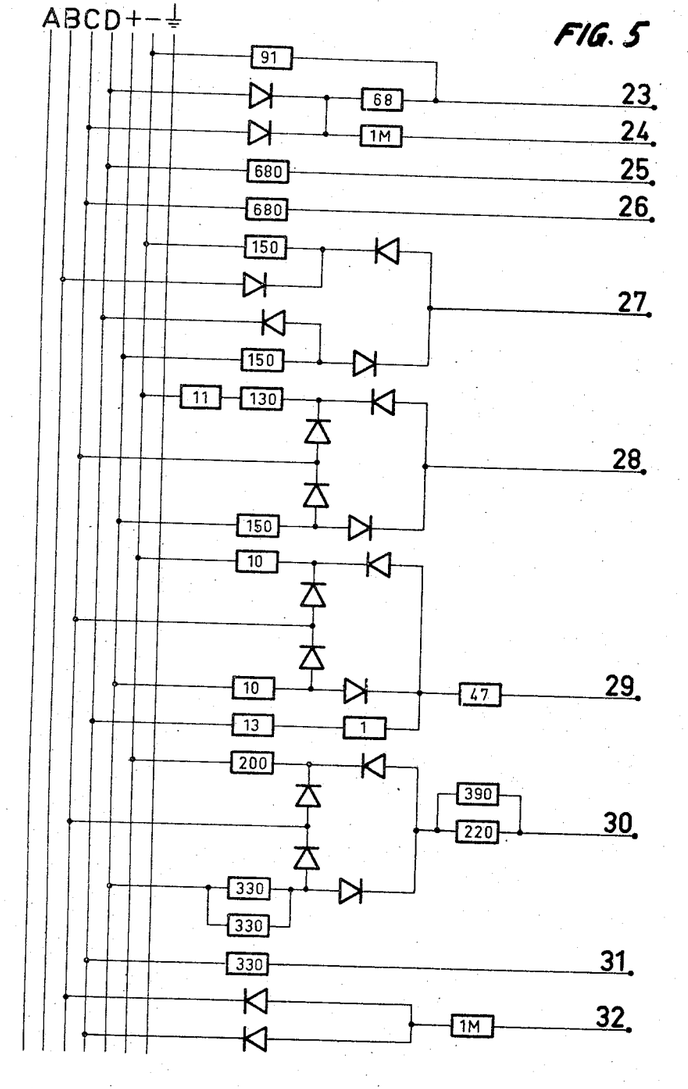
FIG. 5 is a diagram of the circuits for supplying signal components numbered 23 to 32.
Figure 6:
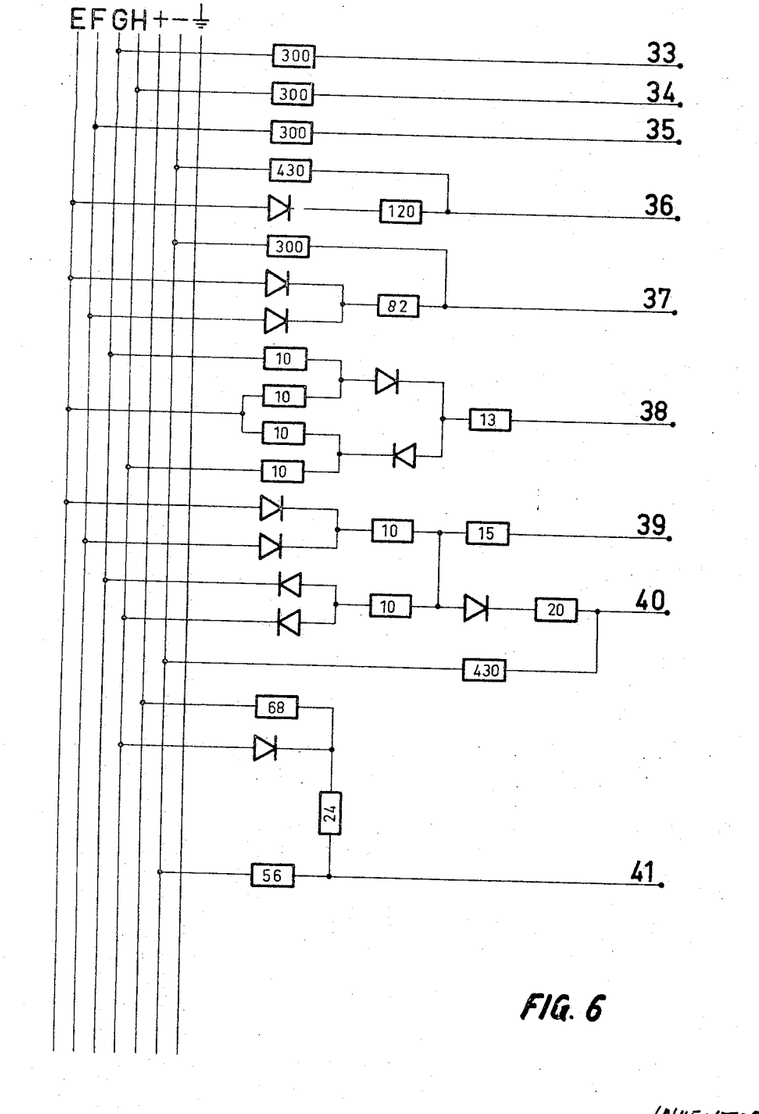
FIG. 6 is a diagram of the circuits for supplying signal components numbered 33 to 41.
Figure 7:
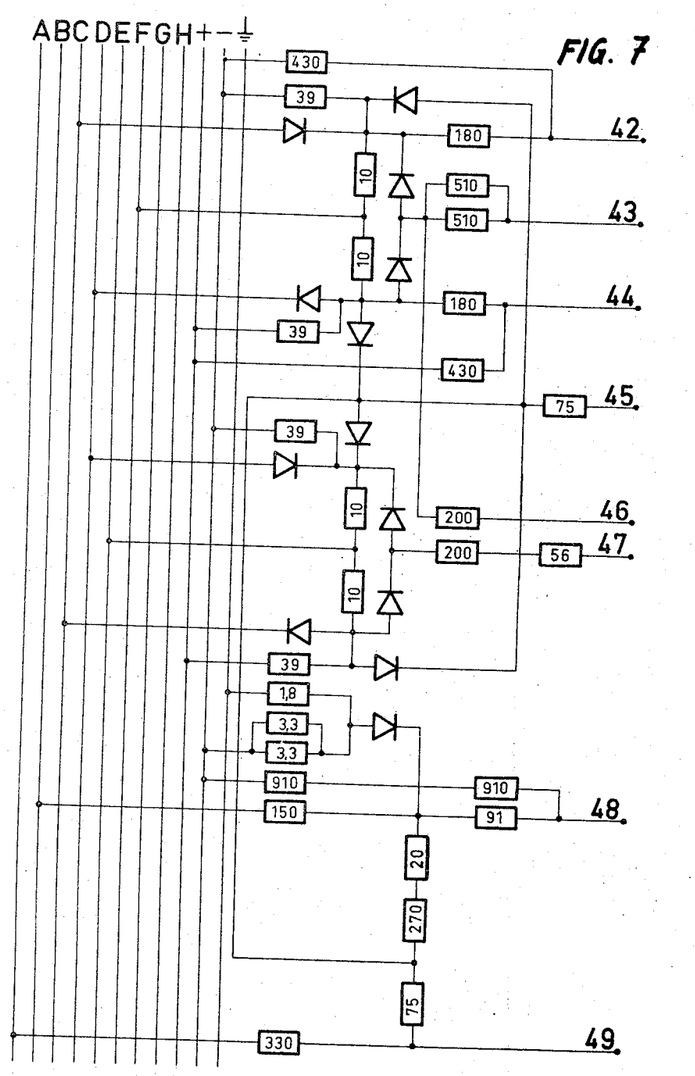
FIG. 7 is a diagram of the circuits for supplying signal components numbered 42 to 49.
Figure 8:
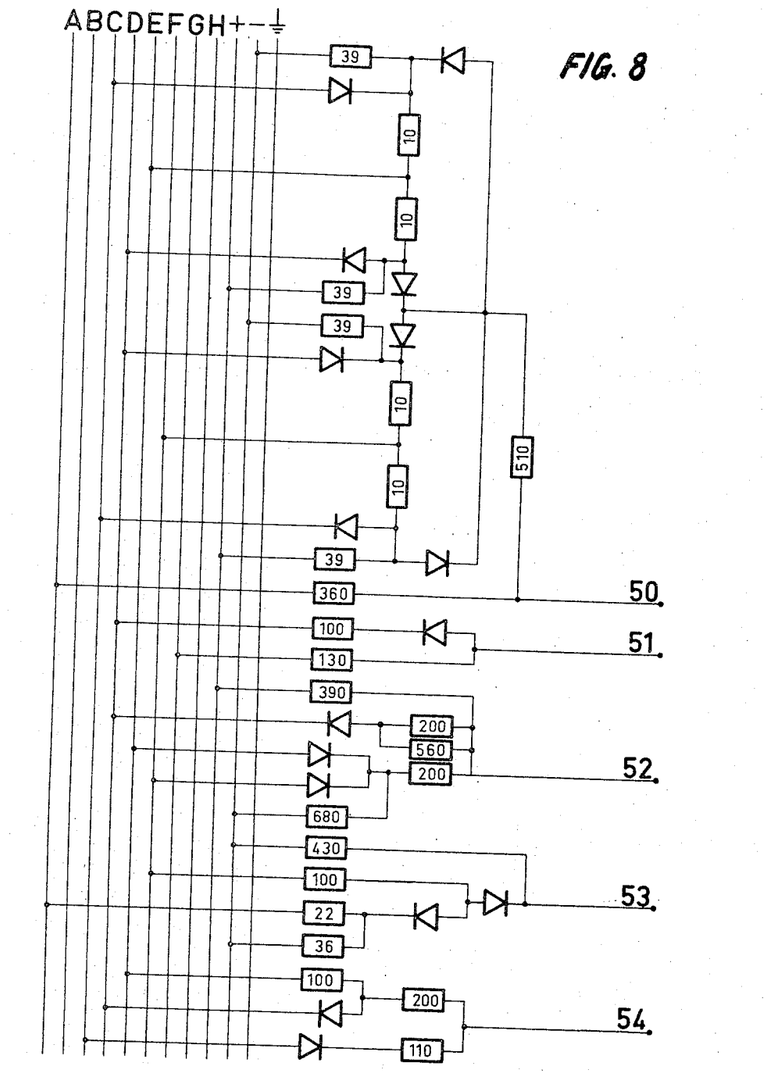
FIG. 8 is a diagram of the circuits for supplying signal components numbered 50 to 54.
Figure 9:
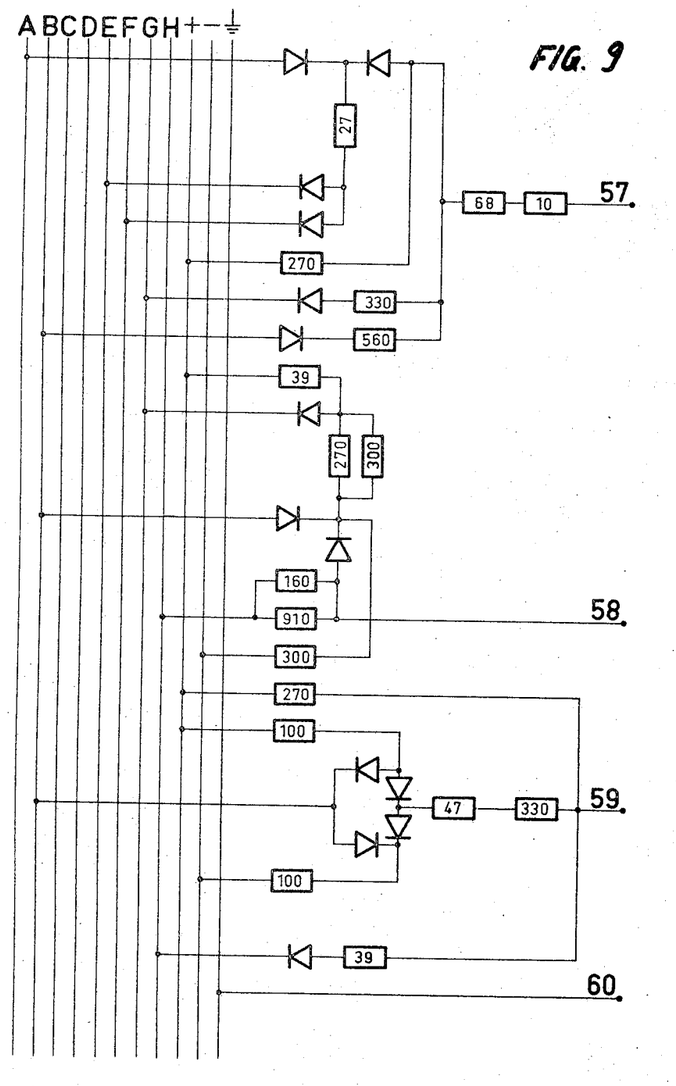
FIG. 9 is a diagram of the circuits for supplying signal components numbered 57 to 60.
Figure 10:
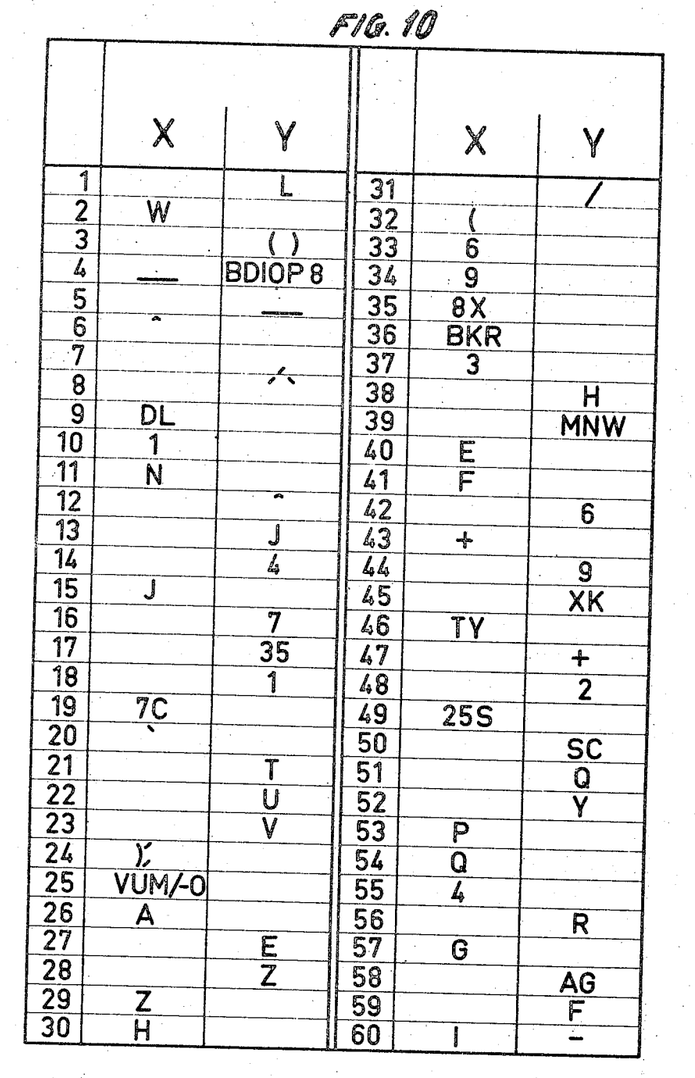
FIG. 10 is a table indicating the use of each of the sixty signal components for the formation of the different signs and letters with which the keyboard of a typewriter is normally provided.
Figure 11:
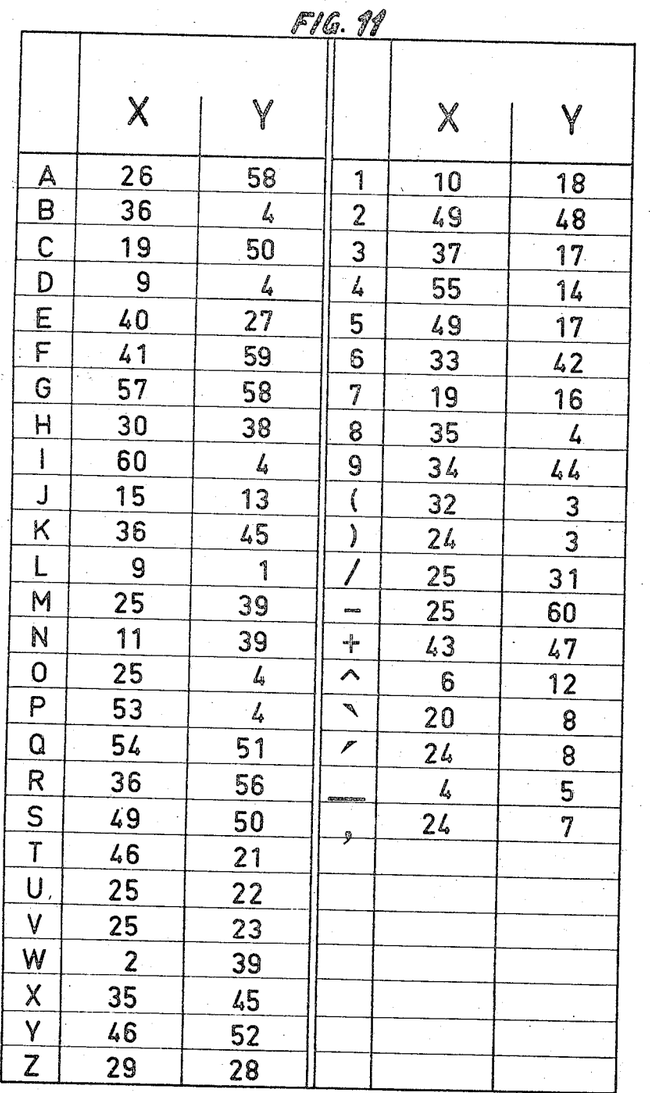
FIG. 11 represents, for each of these signs, the signal component to be selected to ensure the horizontal deviation and the vertical deviation.

FIG. 1 shows that the generator of the device furnishes two groups of four sinusoidal voltages. The first group furnishes:

a voltage A of a determined frequency;
a voltage B of the same frequency, but out of phase by 180° with respect to the voltage A;
a voltage C displaced in phase by 90° with respect to the voltage A; and
a voltage D displaced in phase by 270° with respect to the voltage A.

The voltages of the second group are shown by E, F, G and H and have a frequency which is double that of the voltages of the first group.

The voltage F is displaced in phase by 180° with respect to the voltage E, and the voltages G and H are displaced in phase respectively by 90° and by 270° with respect to the voltage E. All the voltages of the same group have the same amplitude, the voltages of the first group having an amplitude double that of the voltages of the second group.

The device is also supplied by two continuous voltages of opposite polarities and of which the value is sensibly equal to 1.25 times the maximum amplitude of the voltages of the second group (E, F, G, H).

In FIGS. 2 to 9 there has been indicated on the left hand side the input lines for the different voltages furnished by the generator and the two continuous voltages. Each of these input lines corresponds to the letter which refers to the corresponding waveform. The input lines for the continuous voltage of the two polarities are designated respectively by + and −.

FIGS. 2 to 9 show the schematic diagrams of the circuits which enable sixty components of mutually differing outputs to be obtained, each of these outputs being numbered separately. As can be seen, the circuits to establish the forms and frequencies of the waves which are necessary for the excitation of the tracing device to permit the writing of the signs, numbers and letters consist only of resistances, shown as rectangles in the drawings, and unidirectional conductor elements, these latter being constituted, preferably, by diodes having a semi-conductor base.

The values indicated for each of the resistors represent kilo-ohms, these values being chosen in the case where the generator furnishes voltages of the first group presenting a maximum amplitude of 6 v. and voltages of the second group of an amplitude of 3 v. The continuous voltages are then of +3.7 v. and −3.7 v.

Because the circuits comprise only resistances and diodes, which as indicated in the drawings form gating and bias level fixing circuits responsive to predetermined combination of input voltage signals from the generator and D.C. supply, operation without distortion can be obtained in a very large band of frequencies.

The electric signals collected at the terminals of the sixty outputs 1–60, shown in FIGS. 2 to 9, can be selected by devices, not shown, to be applied, after amplification, such as in the manner shown in Patent 3,182,126, to the displacement electrodes of a writing head, which can comprise a nozzle producing a jet of ink and electrostatical deflecting plates deviating said jet, similar to the construction shown in applicant's Patent 3,087,772. These selecting devices, the entry impedance of which is 100 kilo-ohms, are not shown, nor do they form part of the invention; they can be constituted in a very simple manner by interrupters, such as ganged switching devices coupled to and controlled by the keys of a keyboard as shown in Patent 3,182,126, actuated by the touch of the keyboard of the typewriter. The output voltages 4 and 60 must be able to be applied indifferently to the horizontal and vertical deviation plates, whilst the signals of the other outputs are only provided for a pair of plates, either for the horizontal deviation X, or for the vertical deviation Y.

It is of course to be understood that certain modifications may be made to the circuits shown and that in varying slightly the value of the resistances there would be obtained a variation in the trace of the sign or of the signs for which these resistances can play an active role. It is of course very evident that if all the resistances are modified in the same respect, so that their values are proportional to the values indicated in the drawings, the form of the signs traced could not be modified.

I claim:

1. A circuit for supplying complex electric signals for controlling posting or tracing means excited by at least two electric signals representing two components following the coordinate axes of displacement to be effected for tracing an indicia selected from the group composed of signs, capital letters, lower case letters, and numbers of the type normally provided on a typewriter keyboard, comprising electric generator means connected to supply continuously two groups of periodic electric waves of different forms and frequencies with each group comprising four voltage signals, the four voltage signals of the first group being of the same frequency and successively displaced in phase by 90°, the four voltage signals of the second group being of a frequency double that of the first group of voltage signals and successively displaced in phase by 90°, D.C. power source means connected to supply two continuous voltages of opposite polarity, gating circuit means connected with said D.C. power source and generator means and responsive to predetermined combinations of said voltage signals and continuous voltages therefrom to produce for each indicia selected complex output signals of predetermined voltage levels defining the deflection signal components along two coordinate axes for tracing the desired indicia.

2. A circuit as set forth in claim 1 in which said gating circuit means includes a plurality of gating circuits and bias circuit means, and a plurality of unidirectional conductor elements and resistors forming said gating circuits and bias circuit means, whereby said circuits operate in a large frequency band.

3. A circuit as set forth in claim 1 in which the amplitudes of said four voltage signals of said first group are substantially equal, the amplitudes of said four voltage signals of said second group are substantially equal to one-half the amplitude of the voltage signals of said first group, and said two continuous voltages are substantially equal to 1.25 the amplitude of the voltage signals of said second group.

4. A circuit as set forth in claim 1 in which said gating circuit means includes bias circuit means for producing complex output signals of predetermined voltage levels.

References Cited
UNITED STATES PATENTS

| | | | |
|---|---|---|---|
| 1,326,727 | 12/1919 | Hammond | 340—171 |
| 1,356,488 | 10/1920 | Compare | 340—171 |
| 2,406,813 | 9/1946 | De Rosa | 340—171 |
| 2,406,880 | 9/1946 | Young | 178—18 |
| 2,658,942 | 11/1953 | Durkee | 340—171 |
| 2,766,444 | 10/1956 | Sheftelman | 340—318 |
| 2,771,506 | 11/1956 | Coquelet | 340—171.1 |
| 2,989,702 | 6/1961 | White | 340—324.1 |

NEIL C. READ, *Primary Examiner.*

THOMAS A. ROBINSON, *Examiner.*